United States Patent [19]

Fling

[11] 4,154,103
[45] May 15, 1979

[54] COLLAPSIBLE LIQUID LEVEL MEASURING DEVICE

[76] Inventor: William F. Fling, 351 S. Fuller Ave., Apt. 35, Los Angeles, Calif. 90036

[21] Appl. No.: 875,540

[22] Filed: Feb. 6, 1978

[51] Int. Cl.² ............................................. G01F 23/06
[52] U.S. Cl. ...................................... 73/315; 73/305; 73/311; 73/322.5
[58] Field of Search ................................ 73/291–292, 73/305, 311, 315, 322.5; 43/44.87, 44.88, 44.91, 44.92

[56] References Cited

U.S. PATENT DOCUMENTS

| | | | |
|---|---|---|---|
| 1,020,171 | 3/1912 | Woodward | 73/315 |
| 1,144,528 | 6/1915 | Cole | 73/323 |
| 1,505,931 | 8/1924 | Siders | 73/315 |
| 1,557,568 | 10/1925 | Dilley | 73/321 |
| 1,653,759 | 12/1927 | Caretta | 73/314 |
| 1,913,023 | 6/1933 | Farrell | 73/315 |
| 1,947,592 | 2/1934 | Haller | 73/292 |
| 2,043,364 | 6/1936 | Arntzen | 73/311 |
| 2,634,612 | 4/1953 | Quist | 73/291 X |
| 2,651,200 | 9/1953 | Colburn | 73/317 |
| 3,638,492 | 2/1972 | Fling et al. | 73/315 |
| 3,793,884 | 2/1974 | Fling et al. | 73/315 |
| 3,935,741 | 2/1976 | Zinsmeijer et al. | 73/311 X |

*Primary Examiner*—Charles Gorenstein
*Attorney, Agent, or Firm*—William E. Jackson

[57] ABSTRACT

A liquid level measuring device for a container is disclosed. The liquid level measuring device has an elongated frame with a lower end insertable into the liquid in the container. Mounted on the frame is a buoyant floats. The floats and frame are constructed so that the floats is movable along the frame by the buoyant forces of the liquid in the container. The measuring device has a manually operable means for selectively holding the floats in a fixed position relative to the frame so that the frame and floats can be withdrawn from the liquid and the level of the liquid read by comparing the position of the floats in relationship to scale indicia on the frame. The elongated frame is made of a plurality of telescopically arranged sections so that the frame can be collapsed to a minimum length for storage and, when the device is to be used for measuring, the frame sections are moved to expand the length of the frame to the total length of the device. Furthermore, the manually operable means for selectively holding the floats in a fixed position relative to the frame includes an elongated flexible guide tape having one end attached to the section of the frame forming the lower end of the frame and having its other end connected to a coiling means mounted on the upper frame section. Several different embodiments of buoyant floats are disclosed. Also disclosed is an attachment to the collapsible liquid measuring device for obtaining samples of the liquid being measured as well as the temperature of the liquid.

25 Claims, 28 Drawing Figures

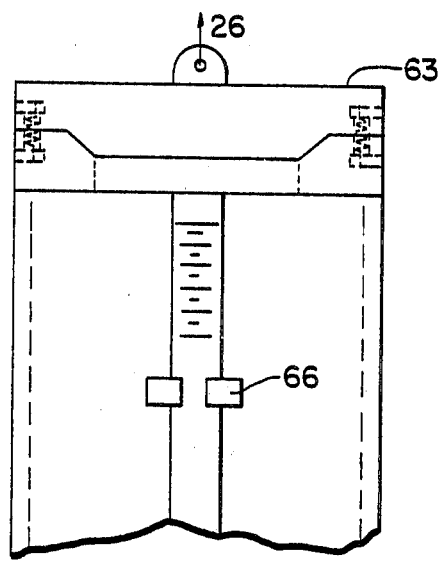
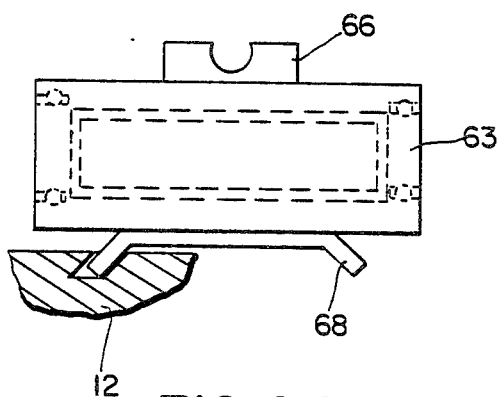
FIG. 21A
FIG. 21B
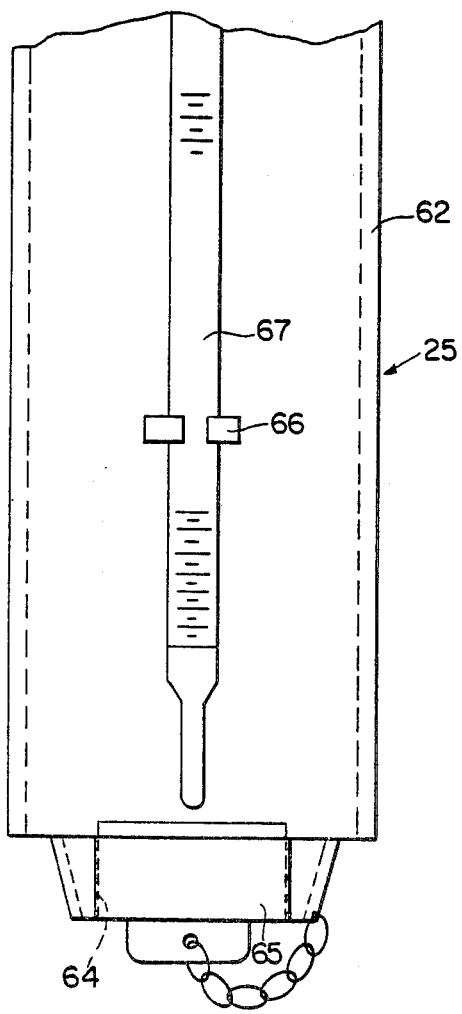

COLLAPSIBLE LIQUID LEVEL MEASURING DEVICE

BACKGROUND OF THE INVENTION

1. Field of the Invention

The present invention relates to liquid level measuring devices, and more particularly to a device having a collapsible frame along which a float (or floats) is moved by the buoyant forces of the liquid being measured.

2. Description of the Prior Art

In the prior art, it is known to measure the level of a liquid in a container by means of a device having a rigid elongated frame, a buoyant float movable along the frame, and a manually operable means for selectively holding the float in a fixed position relative to the frame so that the frame and float can be withdrawn from the liquid and a visual reading obtained from the position of the float with respect to scale indica on the elongated frame. For example, such devices are disclosed in the William F. Fling, et al U.S. Pat. Nos. 3,638,492 and 3,793,884.

The present invention is directed to a liquid level measuring device having various improvements to the known devices exemplified by applicant's prior U.S. patents. One problem involved in prior devices was that they have rigid elongated frames for mounting the flexible guide cables and floats. The devices would be difficult to store in a compact manner and would be unwieldly should the user wish to transport the devices from place to place. These storage and transport problems would be aggravated where the device is twelve or more feet long as required in many installations. Moreover, the accuracy of the prior art devices exemplified by the applicant's prior patents was dependent upon the accurate securement of the float relative to the frame prior to and during withdrawal of the device from the liquid being measured. Thus, it is desirable to have accurate and reliable means for securing the float to the flexible guide means the user desires to withdraw the device from a liquid.

SUMMARY OF THE INVENTION

The present invention is directed to overcoming the above problems by providing a self-contained collapsible liquid level measuring device having an improved frame and improved means for attaching the float (or floats) to the flexible guide means.

Another object of the present invention is to provide a collapsible liquid level measuring device which gives an accurate reading of the level of two different liquids contained in the same container.

A further object of the present invention is to provide an accessory for attachment to a liquid level measuring device whereby a sample of the liquid being measured and its temperature can be obtained upon the withdrawal of the measuring device from the liquid.

Still other objects and advantages of the present invention will be apparent to those skilled in the art by a description of the preferred embodiments which follows.

According to one aspect of the present invention, I provide a liquid level measuring device for a container. The device has an elongated frame with a lower end insertable into a liquid in the container. Mounted on the frame is a buoyant float which is movable along the frame by the buoyant forces of the liquid. Additionally, the measuring device has manually operable means for selectively holding the float in a fixed position relative to the frame. To provide the device with a capability of being collapsed to a minimum length for storage and transport, I provide a frame comprised of a plurality of frame sections arranged to have parallel longitudinal axes. The plurality of frame sections are connected by means to allow relative translative movement of the frame sections along the longitudinal axes so that the frame sections can be moved to contract or expand the length of the elongated frame. Further, I provide an elongated flexible guide means having one end attached to the frame section adjacent to the lower end of the frame and having the other end connected to a coiling means mounted on the upper section of the frame. The coiling means functions to coil the flexible guide means as the frame sections are moved to contract the length of the elongated frame. Also, the coiling means functions to uncoil portions of the flexible guide means as the frame sections are moved to expand the length of the elongated frame. In another aspect of the present invention, I provide locking means for holding the guide means in a tensioned condition when the elongated frame is extended to its full length. According to still another aspect of the present invention, I provide improved means mounted on the buoyant float for attaching the float to the flexible guide means in response to the tensioning of the flexible guide means. Also, according to another aspect of the present invention, I provide an attachment to a liquid level measuring device for the withdrawal of a sample of the liquid being measured at the same time the liquid level measuring device is being withdrawn to obtain a reading. The sampling attachment may have means for taking the temperature of the liquid being samples.

BRIEF DESCRIPTION OF THE DRAWINGS

FIGS. 21A and B are the views of an attachment for the liquid level measuring device according to one embodiment of the present invention.

DESCRIPTION OF THE PREFERRED EMBODIMENTS

Figure 1:
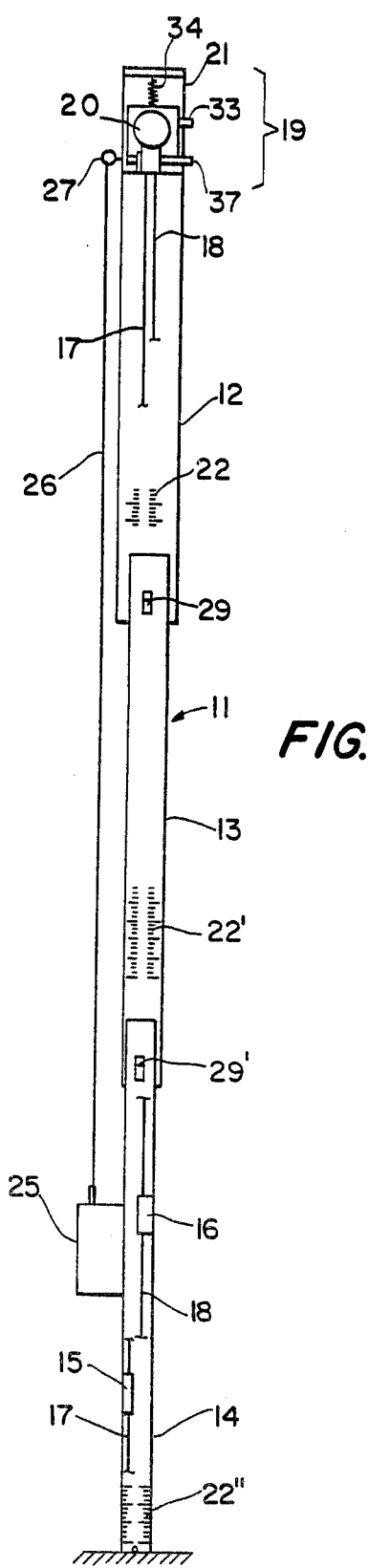
FIG. 1 is a side view with portions broken away showing a device embodying the present invention in its expanded condition.

In the following description, reference is made to various figures of the drawing. Where appropriate, various figures have the same numbers applied to similar parts. I first describe the overall configuration of an embodiment of a liquid level measuring device according to the present invention. Then, I describe various aspects of the device, including various alternate structural and functional arrangements.

Figure 2:
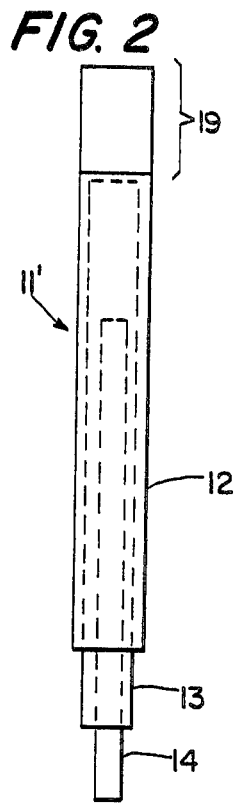
FIG. 2 is a schematic side view showing a device embodying the present invention in a partially contracted condition.
Figure 3:
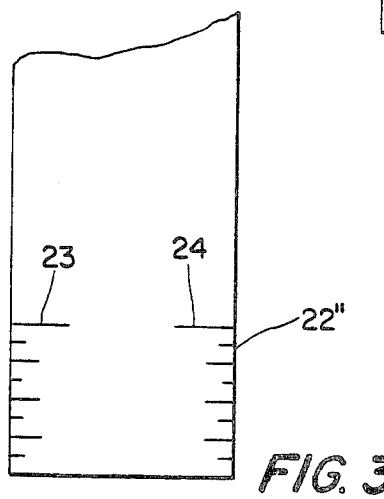
FIG. 3 is an enlarged view of a portion of FIG. 1.

Referring to FIGS. 1, 2 and 3, I disclose a liquid level measuring device 11, having a frame made of elongated sections 12, 13 and 14. These frame sections are connected in a telescopic relationship to form a rigid elongated frame. The frame encloses buoyant floats 15 and 16 of different buoyancies which are shown disclosed in the lower section 14 of the frame. In turn, each of these floats surrounds respective flexible guide tapes 17 and 18. These guide tapes extend the entire length of frame sections 12, 13 and 14. Connected on top of frame section 12, is an upper unit generally designated as 19 which encloses a coiling means 20 for the flexible guide tapes, a guide tape locking mechanism 35, and a manually operable handle 33 for selectively tensioning and detensioning the guide tape 17 and 18. The frame sections 12, 13 and 14 are provided with exterior scale indicia as generally designated at 22, 22' and 22". As shown in the enlarged view in FIG. 3, the scale 22" has respective scales for the floats 15 and 16. In use as seen in FIG. 1, the liquid level measuring device 11 is inserted into a container with liquids therein and the lower end of frame section 14 is rested on the bottom of the container. With two different liquids in the container, such as gasoline and water, the floats will move along frame section 14 until they are floating on the surfaces of the different liquids. Thereafter, through means to be described in more detail below, the floats are rigidly secured in relationship to the frame section 14 and the entire device 11 is removed from the container. Thereafter the user visually notes the position of the floats 15 and 16 in relation to the respective scales on the surface of the frame section 14. Through appropriate calibration, the user can read the amount of gasoline and water directly from the scales on the surface of the frame sections.

When the liquid level measuring device 11 is not in use, it may be collapsed to a minimum length for storage and/or transport. Referring to FIG. 2, it illustrates the manner in which the lower frame section 14 can be telescopically inserted into the interior of frame section 13 and how these two members 13 and 14 can subsequently be telescopically inserted upwardly into upper frame section 12. FIG. 2 shows schematically how this collapsing procedure is carried out. In actual collapsed form, the device 11' will have a minimum length consisting of the length of housing 19 and the length of frame section 12.

Referring to FIG. 1, I also may provide an attachment device 25 for rigid attachment to the frame sections 12, 13 or 14. While attachment 25 is more specifically described below in connection with the drawing, it should be noted that device 25 may comprise a housing and an attached thermometer which are used to take a sample of the liquid being measured as well as the temperature thereof. The attachment 25 is provided with a flexible operating member 26 which extends upwardly generally parallel to the axis of the elongated frame and is attached to housing 19 at point 27.

The device shown in FIG. 1 may be constructed out of materials which resist corrosion or other attack from the liquids or liquid being measured. For purposes of illustration clarity, the device shown in FIG. 1 is constructed out of clear polyvinyl chloride material. Of course other suitable materials may be selected.

Figure 4:
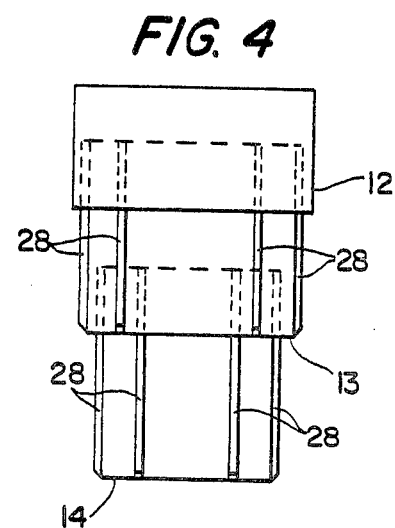
FIG. 4 is an enlarged view of a portion of FIG. 2.
Figure 5:
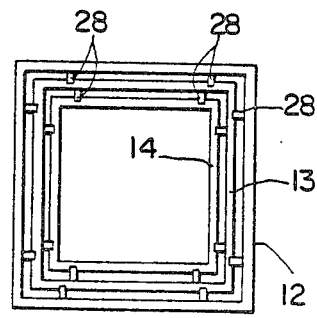
FIG. 5 is a plan view of FIG. 4.

Referring to FIGS. 4 and 5, I show more features of frame sections 12, 13 and 14 with more particularity. As seen in these figures, the frame sections are telescopically arranged square members. In order to facilitate the extension and retraction of the frame sections 12, 13 and 14, I provide a series of guide webs 28 protruding from the outer surface of members 13 and 14. Thus, as seen in FIG. 5, the guide webs 28 insure a spacing between the exterior of inner frame section 14 and the interior of frame section 13. Likewise, the exterior of frame section 13 is spaced from the interior of frame section 12. The guide webs 28 extend the entire length of each of sections 13 and 14. By providing these guide webs 28, the frame sections can be telescopically expanded and yet maintain a substantially rigid connection therebetween at the overlapping of the sections. Thus, when the entire elongated frame is expanded to its maximum length, the guide webs 28 and their cooperating surfaces help to provide a rigidly connected device.

Figure 6:
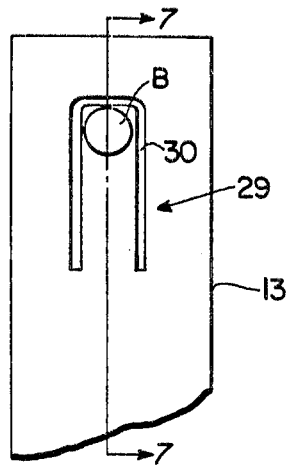
FIG. 6 is a partial view of one of the frame sections of the device of the present invention and shows a portion of a releasable connector for adjacent sections.
Figure 7:
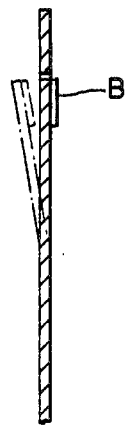
FIG. 7 is a cross-sectional view of FIG. 6 taken along lines 7—7.
Figure 8:
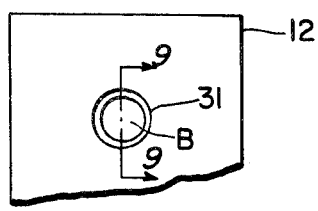
FIG. 8 is a partial view of one of the frame sections of a device embodying the present invention and shows a portion of the releasable connector for these sections.
Figure 9:
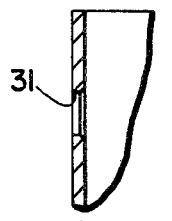
FIG. 9 is a cross-sectional view of FIG. 8 taken along the line 9—9.

Referring to FIGS. 1, 6, 7, 8 and 9, I provide connector means between each frame section so that the elongated frame can be held in its maximum length when extended. The connectors 29 and 29' shown in FIG. 1 are shown in more detail in FIGS. 6 through 9. Thus, as seen in FIGS. 6 and 7, the frame sections 13 and 14 are provided with connectors 29 which are formed by cutting a U-shaped slot 30 in the polyvinyl chloride sheet in one surface of the section. Thereafter, as best seen in FIG. 7, the resilient tab defined by the U-shaped opening 30 is provided with a button B facing outwardly from the exterior of the section. To co-act with the outwardly extending button B, I provide the lower end of frame section 12 with an opening 31 as seen in FIGS. 8 and 9. Moreover, the lower end of frame section 13 is provided with a like opening for co-acting with the button for connector 29' on frame section 14. In use, when the frame sections 12, 13 and 14 are extended to their maximum length to form the elongated frame section, the outwardly facing buttons B are engaged into the holes 31 provided in the lower end of sections 12 and 13. When it is desired to collapse the elongated frame to the position shown in FIG. 2, to provide a collapsed device 11', the user does the following. The liquid level measuring device 11 is withdrawn from the container and the user will press button B to disconnect connector 29'. Then frame section 14 is moved into the interior of frame section 13. The tab and button B for connector 29' are inwardly inserted to ride along the smooth inner surface of frame section 13 as frame section 14 is further moved into frame section 13. Once frame sections 13 and 14 are telescoped together, the connector 29 is disconnected in a manner similar to that 29' and the telescoped members 13 and 14 are pushed further into the interior of frame section 12. It should be understood that when the device 11 is expanded again, the frame sections 13 and 14 are withdrawn out of the frame section 12, and, as the resilient tabs of connectors 29 and 29' approach the coacting holes and their adjacent sections, the connectors 29 and 29' will again rigidly connect sections 13 and 14 together as well as connecting section 13 to frame section 12.

The construction of frame sections 12, 13 and 14 as shown in FIGS. 4 through 9 enable a substantially rigid elongated frame to be provided while also providing the collapsibility necessary to insure the convenient storage and/or transport of the device according to one embodiment of the present invention.

Figure 10:
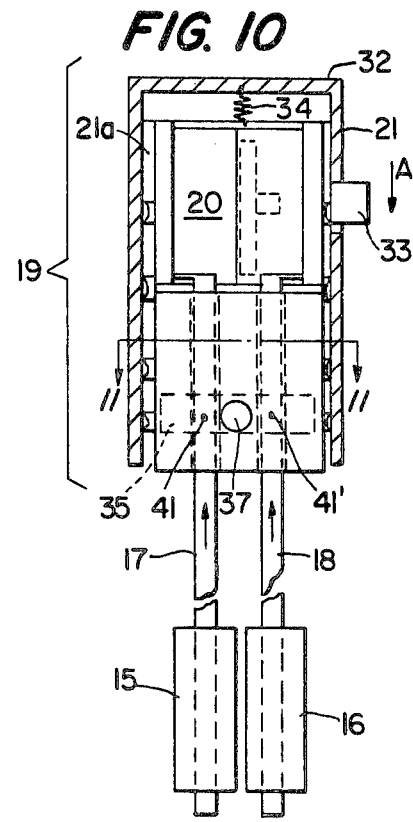
FIG. 10 is an enlarged view of part of the device shown in FIG. 1 with portions broken away for clarity of illustration.
Figure 11:
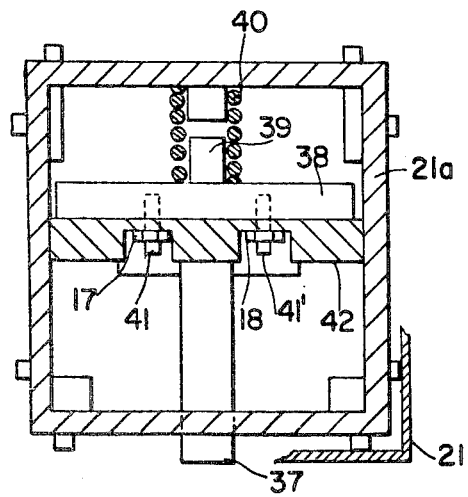
FIG. 11 is a sectional view of FIG. 10 taken along line 11—11.
Figure 12:
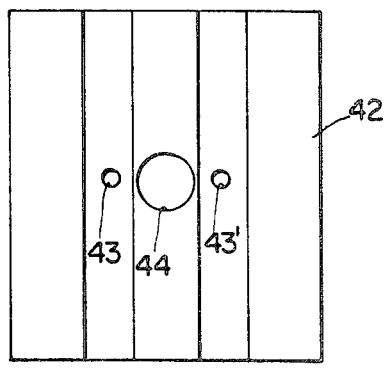
FIG. 12 is a side view of an element shown in cross section in FIG. 11.
Figure 13:
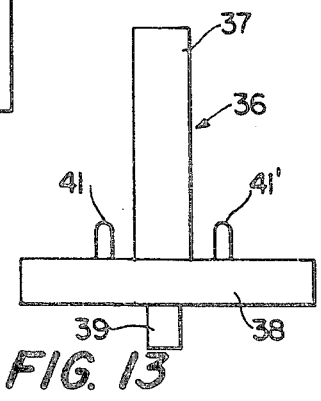
FIG. 13 is a view of a T-shaped locking element shown in FIGS. 10 and 11.
Figure 14A:
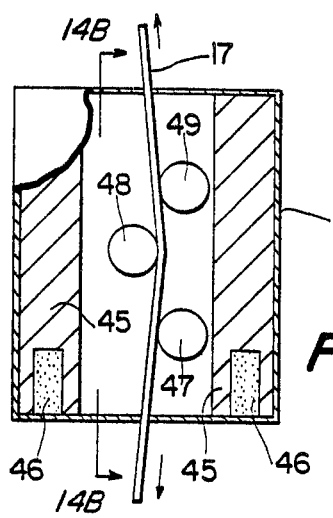
FIGS. 14A and B are elevation and side views, respectively, of an embodiment of a buoyant float according to the present invention.
Figure 14B:
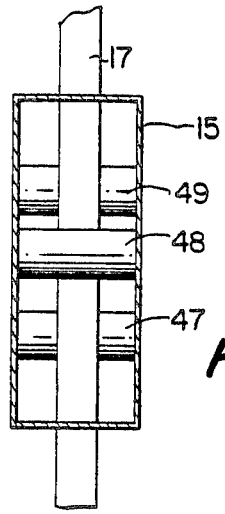

FIG. 10 is an enlarged view with portions broken away of the device 11 shown in FIG. 1. In particular, FIG. 10 shows the relationship of the components of upper unit 19 which co-act with downwardly extending flexible guide tapes 17 and 18 which, in turn, support buoyant floats 15 and 16, respectively. FIGS. 11 through 13 are views of various elements of the structural arrangement shown in FIG. 10. Referring to FIG. 10, the upper unit 19 has a coil means 20 for coiling the guide tapes 17 and 18 when these tapes are moved upwardly in the direction indicated by the arrows on the tape surfaces. Moreover, coil means 20 allow for the uncoiling of the tapes as they are pulled downwardly because of the attachment of their lower ends to the lowermost point of frame section 14 shown in FIG. 1. Coil means 20 may comprise housings having cylindrical interiors with openings to the outside of the housing walls. Spring biasing means may be provided within the housings to aid in the coiling of the tapes 17 and 18. Mounted around the coil means 20 is a housing 21 which is in the form of a rectangular housing having an opening at the lower end and an upper end closed by panel 32. The coil means 20 is movably mounted within the interior of housing 21a so that the coil means 20 can be moved downwardly within the housing by means of handle 33 which is fixedly attached to housing 21a and coil means 20 and extends through a slot in the side of housing 21. The coil means 20 is biased by means of spring 34 into an upper position within the housing 21 by connection to a portion of panel 32. Thus, upon a downward force on handle 33 as seen at A, the coil means 20 will move downwardly inside of housing 21, a distance limited by the lower extent of the slot in the side wall. The purpose for this downward sliding of coil means 20 will be described below.

Upper unit 19 also encloses a guide tape locking means generally designated as 35 in FIG. 10. Further details of the tape locking means are shown in FIGS. 11, 12 and 13. The locking means 35 comprises a T-shaped member 36 as best shown in isolation in FIG. 13. The T-shaped member 36 has an elongated manually operable button 37 extending through a circular opening in the wall of housing 21a as best seen in FIG. 11. Extending outwardly from the T-shaped element formed by the inter section of elements 37 and 38 is a protrusion 39 which is surrounded by a coil spring 40 as best seen in FIG. 11. Furthermore, the cross bar 38 is provided with locking pins 41 and 41'.

In use, the T-shaped member 36 is disposed in a horizontal plane within housing 21 21a as seen in FIG. 10. As best seen in FIG. 11, the locking pins 41 and 41' are biased through a support plate 42 shown in cross section in FIG. 11 and shown in elevation in FIG. 12. The pins 41 and 41' extend through openings 43 and 43' in support plate 42 and the button member 37 extends through opening 44 in the plate 42.

As best seen in FIG. 10, the flexible guide tapes 17 and 18 extend downwardly from the coil means 20, past the locking pins 41 and 41'. The flexible guide tapes 17 and 18 are provided with perforations into which the locking pins 41 and 41' will be introduced under the bias of spring 40 when the guide tapes 17 and 18 have been extended downwardly to bring the perforations into registry with the locking pins 41 and 41'. In order to unlock the pins 41 and 41' from the perforations in guide tapes 17 and 18, the user must press on button 37 of the T-shaped member 36. The manual pressure will counteract the bias of spring 40 to move the T-shaped member and pins 41 and 41' out of engagement with the perforations of guide tapes 17 and 18. While I have here described the structural elements making up the upper portion of the device 11 shown in FIG. 1, I will later describe the operation of the structural elements after providing a description of the construction of floats 15 and 16 which co-act with the operation of the elements in upper unit 19 on the upper frame section 12.

FIGS. 14 through 18 illustrate several constructions of buoyant floats according to embodiments of the present invention. As seen in FIG. 14A, the float generally designated 15 comprises a rectangular housing having an interior hollow portion. Enclosed within the housing 15 is flotation material designated as 45. Also, the flotation material may be provided with a ballast material 46 so that the float 15 will provide a wet line indication along its bottom edge when the edge is aligned with scale indicia on one of the frame sections 12, 13 or 14. Also mounted within the housing according to the construction shown in FIGS. 14A and B, I provide three fixed pins 47, 48 and 49. In use, the flexible guide tape 17 passes between the openings formed between pins 47, 48 and 49, as best seen in FIG. 14A. The vertical overlapping arrangement of the exterior of pins 47 through 49 within the interior of the float 15 enables the float to be selectively locked to the guide tape 17 depending upon the state of tension or slackness of the guide tape 17. Thus, when the guide tape 17 is tensioned, the overlapping pins 47, 48 and 49 cause deflection of the guide tape and the subsequent securing of the float to the tensioned guide tape because of frictional forces acting thereupon. If the guide tape 17 is placed in a slackened condition, the the float 15 is free to move downwardly or upwardly with respect to the guide tape 17. Of course, downward movement of the float 15 would be caused by the force of gravity and the upward movement of float 15 would be caused by the bouyant forces of the liquid into which the float is inserted. Various common materials may be used to provide the buoyancy and ballasting of the hollow float member 15. For example, the flotation material 45 can be balsa wood, expanded closed-cell plastics or other similar buoyant materials. The ballast 46 may be lead or some other suitable weighting material. The casing for the float 15 and the fixed pins 47, 48 and 49 may be made of any suitable plastic material such as polyvinyl chloride or other plastics which are not attacked by the liquid being measured.

Figure 15A:
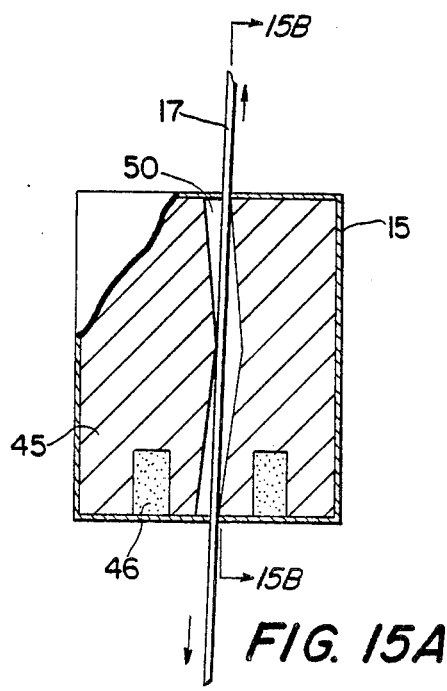
FIGS. 15A and 15B are elevation and side views, respectively, of another embodiment of a buoyant float according to the present invention.
Figure 15B:
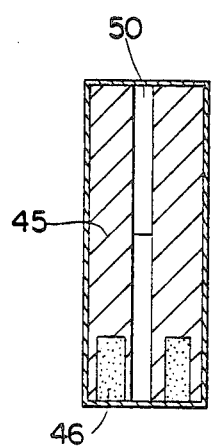

Referring to FIGS. 15A and B I provide another embodiment of float which is subject to being locked to the flexible guide tape 17 depending upon its tension. In FIGS. 15A and 15B, I provide a non-linear axial opening 50 extending through the float 15. As best seen in FIG. 15A, flexible guide tape 17 is disposed within the non-linear axial opening 50. When guide tape 17 is under tension, the non-linear opening 50 will interfere with the tape at three different points and cause attachment of the float 15 to the tape 17 under the operation of frictional forces at the three points. Of course, when tape 17 is slackened, the float 15 in FIG. 15A will rise or fall along the slackened guide tape 17. The float 15 shown in FIGS. 15A and 15B may also have interior flotation material 45 and suitable ballast material 46.

Figure 16:
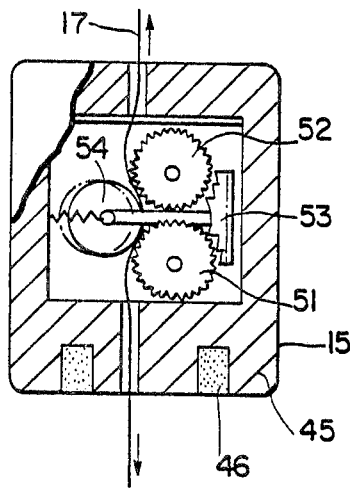
FIG. 16 is an elevation view showing a further embodiment of a buoyant float according to the present invention.
Figure 17A:
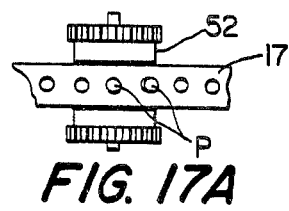
FIGS. 17A and 17B are views showing elements of FIG. 16.
Figure 17B:
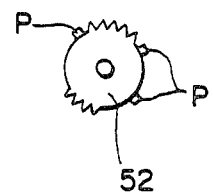
Figure 18A:
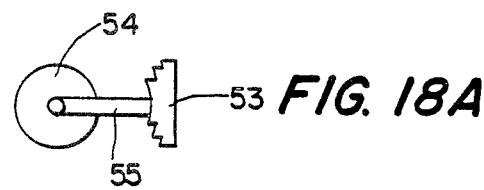
FIGS. 18A and 18B are views showing elements of FIG. 16.

Referring now to FIG. 16, I provide still another embodiment of a float capable of being locked and unlocked to the flexible guide tape 17 depending upon the state of tension or slackness of the guide tape. In the embodiment shown in FIG. 16, I provide two rotatable tape guide rollers 51 and 52. These rollers are rotatably mounted within the interior of the housing for the float 15. The outer periphery of guide rollers 51 and 52 are provided with teeth or a similar roughened surface to co-act with a brake member 53 as will be described. In addition, in FIG. 16 I provide a spring-biased idler roller 54 which is mounted for linear movement within the float 15 from left to right, as shown in FIG. 16. Attached to idler roller 54 by means of side plates 55 and 56 is the brake member 53 as best seen in FIGS. 18A and B. Referring to FIG. 16, the assembly of roller 54 and brake 53 is spring-biased to the right by a compression spring 57. In operation, the mechanism contained in float 15 is operated depending upon the state of tension or slackness of flexible guide member 17. Thus, the guide member is passed between rollers 52 and 54 and between rollers 54 and 51. When flexible guide 17 is under a tension force as shown by the arrows in FIG. 16, the force acts on the surface of roller 54 and against the bias of spring 57 so as to move brake 53 to the left to engage the teeth or other roughened surface on the periphery of rollers 53 and 51. Since pins P on one or both these rollers are in engagement with perforations in tape 17, as seen in FIG. 17A, the stoppage of the free rotation of rollers 51 and 52 will also stop the upward or downward movement of the float 15 with respect to the flexible guide tape 17. On the other hand, when flexible guide tape 17 is in slackened condition, compression spring 57 will bias the brake 53 to the left out of engagement with the peripheral surface of the rollers 51 and 52 and the slackened tape 17 will no longer be rigidly held by the pins P on the surfaces of rollers 51 and/or 52. Thus, float 15 is then free to move downwardly or upwardly under the forces of gravity or buoyancy. The float shown in FIG. 16 may also be provided with flotation material 45 and ballast material 46.

Having described three embodiments according to the present invention wherein the float 15 is either attached or unattached from flexible guide tape 17 depending upon the tension of the guide tape, I will now describe how the float 15 is locked in the desired position with respect to the frame section when the liquid level measuring device 11 is being used to measure the level of liquid in the container. For ease of understanding, reference is made to FIG. 10 which has been generally described above. I will describe the sequence of operation of device 11, starting with it being in a collapsed condition or a minimum length. From that point, I will describe the extension of the device for the purpose of measuring and the operation of the tapes, floats, and manually operable means for locking the floats to the guide tapes.

When the device 11 is in the collapsed condition partially shown in FIG. 2, substantially all of the length of flexible guide tapes 17 and 18 are coiled about themselves within the coil means 20 as seen in FIG. 10. Moreover, the other ends of flexible guide tapes 17 and 18 are connected to the frame section 14 adjacent to the lower end of that frame section. Of course, since frame section 14 is telescopically contracted, only a relatively short section of tapes 17 and 18 are uncoiled from coil means 20 when the device 11 is in a collapsed condition. As the frame sections 12, 13 and 14 are telescopically expanded, the movement of the lower frame section 14 will act to uncoil the flexible guide tapes 17 and 18 from their coil means 20. Thus, the flexible guide tapes 17 and 18 will be uncoiled similar to the uncoiling of a carpenter's flexible ruler. In accordance with the present invention, the flexible guide tapes 17 and 18 are each provided with a perforation adjacent their uppermost ends. Thus, as the tapes 17 and 18 are uncoiled downwardly and out of the coil means 20, the perforated portions are uncoiled and are drawn past the locking pins 41 and 41' which are spring-biased against the surface of the tapes. When the perforations are in registry with the spring-biased locking pins 41-41', the pins enter the perforations and rigidly fix the tapes with respect to the housing 21a. The lengths of flexible guide tapes 17 and 18 from their perforated portions to the extreme other ends which are attached to frame section 14 are designed so that the frame sections 12, 13 and 14, when locked in place in the extended mode, will place tapes 17 and 18 under tension due to the locking of their other ends by pins 41-41'. Thus, in the normal extended mode of device 11, the tapes 17 and 18 are held under tension between locking pins 41-41' and their connections to the lowermost frame section 14.

After the frame has been extended to its maximum length and the flexible guide tapes 17 and 18 are locked in a tensioned state, as described above, the device 11 is ready for insertion into a container in order to measure the liquid levels therein. Upon insertion of the device 11 into the container, the lower end of frame section 14 is rested on the bottom of the container. Thereafter, the operator must release the floats 15 and 16 from the tensioned guide tapes so that the floats will respond to the forces on them due to the buoyancy effect of the liquids being measured. As the next step in taking a liquid level measurement, the operator will depress handle 33 as shown by arrow A in FIG. 10. As described above, movement of handle 33 in a downward direction, moves the coil means 20 downwardly against the bias of spring 34 which tends to hold coil means 20 toward the upper end of housing 21. By moving the coil means 20 downwardly, tension on the guide tapes 17 and 18 is relaxed, thus slackening each guide tpe. As described above in connection with the three embodiments of floats shown in FIGS. 14 through 18, the slackening of the tension on the guide tapes enables the floats to move freely along the surface of the guide tape.

If there is liquid in the container being measured, then the buoyant forces of the liquid will operate on the floats to cause them to seek out their equilibrium floating level. Once sufficient time has been allowed for the floats to come to floating equilibrium in the liquid being measured, the operator merely releases the downward pressure on handle 33 and the coil means 20 is once again moved upwardly in housing 21 to re-tension the flexible guide tapes. As discussed in detail above, the tensioning of guide tapes will cause the floats to be securely attached to the guide tapes. After the securing of the floats to the guide tapes, the operator can withdraw device 11 from the liquid container and the floats will retain their locked position fixed in relationship to the elongated frame. After withdrawal, the operator can make a visual liquid level determination by comparing the wet line of the floats with the associated scale indicia on the elongated frame.

If it is desired to collapse the device after the liquid level readings have been taken, the operator merely needs to push the button 37 against the bias of spring 40 so as to release the locking pins 41–41' from the perforations in the flexible guide tapes. Thereafter, the frame sections 14 and 13 can be moved upwardly so as to telescope them into the interior of frame section 12. The flexible guide tapes 17 and 18 will coil upon themselves in coil means 20, as the sections 14 and 13 are moved upwardly since the lower end of the flexible guide tapes are rigidly connected to the lower end of frame section 14.

Thus, it should be apparent that I have provided a liquid level measuring device having a capability of being expanded and collapsed for ease of storage and/or transport and which provides a novel cooperation between storable flexible guide tapes and the collapsible elongated frame. In addition, I have provided novel float constructions which respond to the tensioning or de-tensioning of the flexible guide tapes so as to lock the floats to the tapes at the desired time so that an accurate comparison can be made of the position of the floats relative to the elongated frame and the scale indicia thereon.

Figure 19A:
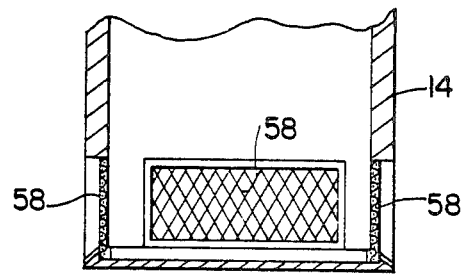
FIGS. 19A, 19B and 19C are partial views of the bottom frame section shown in FIG. 1.
Figure 18B:
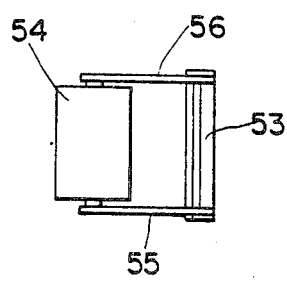
Figure 19B:
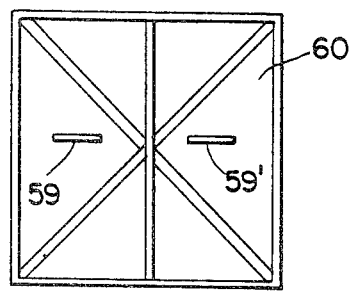
Figure 19C:
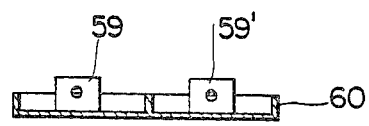

With reference to FIGS. 19A through C, I show structural details of the lower end of section 14 of the elongated frame. This lower portion is the end that rests against the bottom of the liquid container during the time interval when the floats are seeking out their equilibrium floating level. As seen in FIG. 19A, I provide screen-filled openings 58 at the lower end of frame section 14. The purpose for the openings is to allow fluid to enter the interior of the liquid level measuring device and the function of the screens is to insure that any sediment at the bottom of the liquid container will not be carried into the interior of the container to contaminate or foul the operation of the mechanical mechanisms in the floats or the other operative elements.

Figure 20:
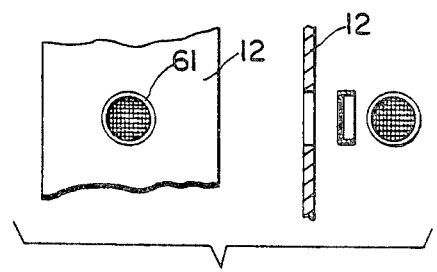
FIG. 20 is an exploded view of drain openings for frame sections according to the present invention.

As best seen in FIGS. 19B and C, I provide eyelet means 59 and 59' attached to the lower plate 60 which forms the lowest portion of frame 14. The purpose of these eyelet means 59 and 59' is to rigidly connect the lower ends of the guide tapes 17 and 18 to the lower end portion of the elongated frame to insure against twisting of the guide tapes. Because elements 59 and 59' extend only a short distance above the very bottom surface of the liquid container, the floats which move along guide tapes 17 and 18 can ride on the guide tapes to a position substantially near to the bottom of the liquid container. Thus, the construction of the present device allows the measurement of very low levels of liquid in the container. In addition to the screen-filled openings 58 in member 14, I may provide a series of spaced screen-filled drain holes 61 in the various frame sections 12, 13 and 14 of the elongated frame. As seen in FIG. 20, these screen-filled drain holes may be provided so that undesired sediment or other contaminents will not enter the interior of the measuring device 11. The provision of screen-filled opening 58 and 61 insures that the liquid contained inside of the elongated frame will drain out of the measuring device before it is completely removed from the liquid container.

FIGS. 21A and 21B show the structural details of the attachment generally designated as 25 in FIG. 1. The attachment 25 is a liquid sample container 62 having a cap 63 and a lower opening 64 closed by a plug 65. Also attached to the surface of sample container 62 by means of resilient flexible clips 66 is a temperature-measuring device 67. The attachment 25 can be attached in any suitable manner to one of the frame sections 12, 13 or 14 depending upon the level of liquid which is to be sampled or checked for temperature. As shown in FIG. 21B, one form of mounting arrangement is a mounting plate 68 which co-acts with a grooved section on the surface of the frame sections 12, 13 and 14. The cap 63 for the sample container 62 is resiliently attached by springs to the upper portion of container 62 so that the cap can be pulled upwardly relative to the top of the sample container 62 to allow a liquid sample to enter the container 62. In operation, the cap 63 is raised by means of an operating line 26 as best seen in FIG. 1, the lower end of the operating member 26 being attached to the cap 63 by means of an eyelet means and the upper end of the flexible line 26 being attached to upper unit 19 adjacent the upper end of the device 11. In operation, when the device 11 is inserted into a container to measure liquid levels, the attachment 25 has already been located in the desired position on one of the housing members 12, 13 or 14. After the device has been inserted into the liquid container and an equilibrium has been obtained with regard to the position of the floats and a suitable interval has been allowed for temperature-measuring device 67 to react to the liquid temperature, the entire device 11 can be taken out of the liquid. If it is desired to have a liquid sample, the operating line 26 is pulled upwardly by the operator at the top of the measuring device 11 and this moves cap 63 upwardly against the downward spring bias to allow the cap to separate from the top of container 62. Thereafter, liquid will fill the hollow container 62 and the cap 63 can be released for covering the opening to entrain the sample within the container 62. Thus, while the remainder of the liquid level measuring device is designed to drain of all liquid being measured prior to removal, the sample container 62 is a closed container filled with a sample of the liquid. When it is withdrawn, the operator can read the temperature off of device 67 as well as releasing the entrained sample by means of opening container 62 by removal of plug 65 from the lower opening 64 in the container.

The present invention has been described in detail with particular reference to the embodiments thereof, but it should be understood that variations and modifications can be effected within the spirit and scope of the invention as described here and as defined in the appended claims.

I claim:

1. In a liquid level measuring device for a container, said device having an elongated frame with a lower end insertable into a liquid in a container, a buoyant float, means for mounting said float on said frame so that said float is movable along the frame by the buoyant forces of a liquid, and manually operable means on said frame for selectively holding said float in a fixed position relative to said frame, the improvement wherein:

said elongated frame comprises at least first and second frame sections having parallel longitudinal axes, means for connecting said first and second frame sections for relative translative movement along said axes so that said frame sections can be moved to contract or expand the length of said elongated frame;

said manually operable means for selectively holding said float in a fixed position relative to said frame includes an elongated flexible guide means having one end attached to said second frame section adjacent to said lower end of said frame and having the other end connected to a coiling means mounted on said first frame section adjacent to the upper end of said frame, said coiling means coiling said flexible guide means as said frame sections are moved to contract the length of said elongated frame and uncoiling said flexible guide means as said frame sections are moved to expand the length of said elongated frame, whereby said liquid level measuring device is collapsible for storage and transport.

2. The invention of claim 1, wherein said manually operable selective holding means includes means for tensioning and detensioning said flexible guide means, attaching means mounted on said float for attaching said float to said guide means in response to the tensioning of said guide means and for detaching said float from said guide means in response to the detensioning of said guide means so that said float can be moved along said guide means by the buoyant forces of a liquid.

3. The invention of claim 1, wherein two floats of different buoyancies are respectively mounted on two elongated flexible guide means, whereby said liquid level measuring device is adapted to measure two different liquids in a container.

4. The invention of claim 1, wherein said first and second frame sections are hollow, said second frame section being adapted for telescopic movement with respect to said first frame section, and said elongated flexible guide means is disposed within the interior of said frame sections.

5. The invention of claim 4, wherein the exterior of said second frame section is provided with means for engaging the interior of said first frame section for facilitating the relative translative movement of said second frame section with respect to said first frame section.

6. The invention of claim 5, wherein said engaging means is provided by longitudinal webs extending outwardly from the exterior surface of said second frame section to engage the interior surface of said first frame section.

7. The invention of claim 1, further comprising connector means for fixedly connecting the lower end of said first frame section to the upper end of said second frame section when said sections are moved to an expanded position wherein the length of said frame is at its maximum elongated length.

8. The invention of claim 7, wherein said connector means comprises a hole defined in the lower end of said first frame section and a button mounted on a resilient tab formed on the exterior of the upper end of said second frame section, said button being inserted into said hole when said frame sections are connected and being moved radially inward when said frame sections are disconnected.

9. The invention of claim 1, further comprising means for automatically locking said guide means in a tensioned condition when said frame is in its maximum elongated position, said locking means being mounted adjacent the upper end of said first frame section and serving to tension said guide means between the upper and lower ends thereof.

10. The invention of claim 9, wherein said automatic locking means comprises a locking pin, means for mounting said locking pin for movement toward and away from said guide means, means for biasing said pin toward said guide means, means for manually moving said pin away from said guide means against the action of said biasing means, and means on said guide means for engagement with said pin, said engagement means being positioned on said guide means to be engagable with said pin when said frame is in its maximum elongated position.

11. The invention of claim 2, wherein said flexible guide means is a flat tape, and means are provided to connect said tape to said frame to constrain twisting of said tape about its longitudinal axis.

12. The invention of claim 2, wherein said means for tensioning and detensioning said flexible guide means comprises a support means mounted on the upper end of said first frame section for supporting said coiling means for movement relative to the upper end of said first frame section, spring biasing means for biasing said support means toward the upper end of said first frame section, and handle means rigidly connected to said support and coiling means for manually moving said support and coiling means downwardly with respect to the upper end of said first frame section to thereby release the tension in said flexible guide means.

13. The invention of claim 2, wherein said float has an opening therein and said flexible guide means extends through said opening.

14. The invention of claim 13, wherein said attaching means comprises three pins fixed within the opening in said float, said pins defining two openings therebetween through which said guide means passes, said pins being constructed and arranged so that, when said guide means is tensioned, the pins cause deflection of said guide means to secure said guide means against said pins, and when said guide means is detensioned, said openings between said pins allow free movement between said pins and said guide means, whereby said float can be moved along said detensioned guide means by buoyant forces of a liquid or by gravity forces.

15. The invention of claim 13, wherein said attaching means comprises a nonlinear opening defined by said float, said opening having three contact points past which said guide means passes, said points being constructed and arranged so that, when said guide means is tensioned, the contact points cause deflection of said guide means to secure said guide means against said contact points, and when said guide means is detensioned, said non-linear opening allows free movement between said contact points and said guide means, whereby said float can be moved along said detensioned guide means by buoyant forces of a liquid or by gravity forces.

16. The invention of claim 13, wherein said attaching means comprises two guide rollers rotatably mounted on said float, a roller movably mounted on said float and being attached to a brake means for engagement with at least one of said guide rollers, said guide and movable rollers defining two openings therebetween through which said guide means passes in surface engagement with said guide rollers, said guide and movable rollers being constructed and arranged so that when said guide means is tensioned, said at least one guide roller is engaged by said brake means to stop rotatable movement of said at least one guide roller, and said flexible guide means are held in a relatively fixed position because of the surface engagement between the flexible guide means and said guide roller, and spring means for biasing said movable roller and said brake means out of engagement with said at least one guide roller, said spring means, said brake means and said guide and movable rollers being constructed and arranged so that, when said flexible guide means is detensioned, said openings between guide and movable rollers allows free relative movement between said flexible guide means and said guide and movable rollers, whereby said float can be moved along said detensioned flexible guide means by buoyant forces of a liquid or by gravity forces.

17. The invention of claim 12 further comprising means for automatically locking said guide means in a tensioned condition when said frame is in its maximum elongated position, said locking means being mounted on said support means adjacent the upper end of said first frame section and serving to tension said guide means between the upper and lower ends thereof.

18. The invention of claim 17, wherein said automatic locking means comprises a locking pin, means for mounting said locking pin on said support means for movement toward and away from said guide means, means for biasing said pin toward said guide means, means for manually moving said pin away from said guide means against the action of said biasing means, and means on said guide means for engagement with said pin, said engagement means being positioned on said guide means to be engageable with said pin when said frame is in its maximum elongated position.

19. The invention of claim 1, further comprising a liquid sample container mounted on said elongated frame, said container having a closure means movably mounted thereon, and means connected to said closure and extending to the upper end of said first frame section for manual upward movement to open said closure when said frame and container is inserted into a liquid in a container, whereby a liquid sample can be entrained in said sample container and spillage thereof is avoided during removal of said frame and sample container from said liquid.

20. The invention of claim 19, wherein said sample container has means thereon for detachable mounting on said frame.

21. The invention of claim 19, wherein said sample container has means thereon mounting a temperature sensing device so that the temperature of a liquid can be taken at the same time a liquid sample is taken.

22. In a liquid measuring device for a container, said device having an elongated frame with a lower end insertable into to liquid in a container, a buoyant float, flexible guide means extending through an opening in said float for mounting said float on said frame so that said float is movable along the frame by the buoyant forces of a liquid, and manually operable means on said frame for selectively holding said float in a fixed position relative to said frame, the improvement wherein said manually operable selective holding means includes means for tensioning and detensioning said flexible guide means, attaching means mounted on said float for attaching said float to said flexible guide means in response to the tensioning of said flexible guide means and for detaching said float from said flexible guide means in response to detensioning of said flexible guide means so that said float can be moved along said flexible guide means by buoyant forces of a liquid, said float being spaced apart from said frame when said float is attached to said tensioned guide means.

23. The invention of claim 22, wherein said attaching means comprises three pins fixed within the opening in said float, said pins defining two openings therebetween through which said guide means passes, said pins being constructed and arranged so that, when said guide means is tensioned, the pins cause deflection of said guide means to secure said guide means against said pins, and when said guide means is detensioned, said openings between said pins allow the free movement between said pins and said guide means, whereby said float can be moved along said detensioned guide means by buoyant forces of a liquid or by gravity forces.

24. The invention of claim 22, wherein said attaching means comprises a nonlinear opening defined by said opening having three contact points past which said guide means passes, said points being constructed and arranged so that when said guide means is tensioned, the contact points cause deflection of said guide means to secure said guide means against said contact points, and when said guide means is detensioned, said non-linear opening allows free movement between said contact points and said guide means, whereby said float can be moved along said detensioned guide means by buoyant forces of a liquid or by gravity forces.

25. The invention of claim 22, wherein said attaching means comprises two guide rollers rotatably mounted on said float, a roller movably mounted on said float and being attached to a brake means for engagement with at least one of said guide rollers, said guide and movable rollers defining two openings therebetween through which said guide means passes in surface engagement with said guide rollers, said guide and movable rollers being constructed and arranged so that when said guide means is tensioned, said at least one guide roller is engaged by said brake means to stop rotatable movement of said at least one guide roller, whereby said guide roller and said flexible guide means are held in a relatively fixed position because of the surface engagement between the flexible guide means and said guide roller, and spring means for biasing said movable roller and said brake means out of engagement with said at least one guide roller, said spring means, said brake means and said guide and movable rollers being constructed and arranged so that, when said flexible guide means is detensioned, said openings between guide and movable rollers allows free relative movement between said flexible guide means and said guide and movable rollers, whereby said float can be moved along said detensioned flexible guide means by buoyant forces of a liquid or by gravity forces.

* * * * *